Patented May 1, 1923.

1,453,562

UNITED STATES PATENT OFFICE.

ROBERT E. WILSON, LEON W. PARSONS, AND STANLEY L. CHISHOLM, OF WASHINGTON, DISTRICT OF COLUMBIA.

PROCESS FOR THE PRODUCTION OF ALKALI-EARTH-METAL PERMANGANATES.

No Drawing. Application filed September 27, 1918. Serial No. 255,975.

*To all whom it may concern:*

Be it known that we, ROBERT E. WILSON, LEON W. PARSONS, and STANLEY L. CHISHOLM, citizens of the United States, and stationed at Washington, District of Columbia, in the office of the Director of the Chemical Warfare Service, Research Division, have invented a Process for the Production of Alkali-Earth-Metal Permanganates, of which the following is a specification.

The present invention relates to the production of alkali-earth metal permanganates and especially the permanganates of calcium and magnesium as these have been found to be very efficient oxidizing agents for certain purposes, more efficient even than the permanganates of the alkali-earth metals. This superiority is shown in the so-called "British soda lime granules."

More specifically, the object of the invention is the development of a commercial process of producing the alkali-earth metal permanganates, since so far as we are aware, their manufacture in quantity has never been attempted on a large scale or even on a small scale, except in Germany, where they have been produced by a rather expensive electrolytic process starting with potassium permanganate ($KMnO_4$).

We have discovered that calcium or magnesium permanganate cannot be prepared directly by ordinary methods but that indirect methods must be used, e. g., by first forming a manganate, oxidizing this, and neutralizing the permanganic acid so formed with barium, calcium or magnesium hydroxide.

We have investigated very thoroughly the possible methods of making calcium permanganate and believe that only four of them are at all workable. These are:

(1) Preparation of silver permanganate by crystallization from slowly cooled solutions of silver nitrate and potassium or sodium permanganate. Calcium permanganate is then formed metathetically by treatment with calcium chloride.

(2) Selective transference and oxidation electrolysis of sodium or potassium manganate or permanganate and milk of lime or a calcium salt.

(3) Electrolysis of ferro manganese anode into solution of a calcium salt.

(4) Preparation of barium manganate by fusion or wet methods, conversion to permanganate by oxidation or acidification, metatheses into calcium permanganate by treatment with calcium sulphate or milk of lime.

Of these four possible methods, (1) is not a possible large scale method on account of its use of silver; (2) and (3) are electrolytic methods without a great deal of promise, and are to be considered elsewhere; (4) is the principal subject of this application.

Three distinct methods for preparing barium (or strontium) manganate have been here investigated. The first of these methods involves heating together barium peroxide, hydroxide, or a salt, such as the nitrate or chlorate, with an oxide of manganese, as manganese dioxide. Considerable work has been done upon fusions of this type, and beautiful green products were obtained, but the most favorable results obtained gave products containing only 8–10% $BaMnO_4$, the rest of the product consisting of residual $MnO_2$, $BaO$ and the $BaMnO_3$ from the thermal decomposition of the manganate. The thorough mixing of such dry sinterings is rather difficult, but quite necessary; indeed even the fusions should be stirred to give the best results.

The second and more preferable of these methods involves the reaction of similar mixtures in a low melting fused medium, such as fused sodium hydroxide, or sodium nitrate at temperatures well below a red heat. The cooled fused mass is extracted with water, the filtrate containing chiefly $NaOH$ or $NaNO_3$ being evaporated to dryness, and the fusion medium being returned to the process. The insoluble residue consists of a basic barium mangani-manganate containing 20–32% $BaMnO_4$, together with excess $MnO_2$, etc. This represents a decided gain over the first, or dry fusions.

Both of these methods, however, in many ways appear less attractive than a third method, which consists in boiling "green ash leachings" containing about 8% $Na_2MnO_4$ and 15–20% $NaOH$, with a soluble barium compound, such as the hydroxide or chloride, filtering off and washing the insoluble barium manganate precipitate and evaporating down the filtrate to return the caustic to the process in the "green ash" (manganate) fusion. Barium manganate precipitates obtained on a small scale in this wet way contained 70–75% BaMnO$_4$, the remainder appearing to consist of absorbed alkali and alkaline salts and barium carbonate, unless the green liquor has been previously boiled with milk of lime to remove the carbonate almost invariably present. Even in this case the precipitate generally contains some carbonate due to absorption of atmospheric carbon dioxide during manipulation of the alkaline barium mixtures. The use of the barium hydroxide would probably be preferable to that of a salt such as the chloride as no impurities are thus introduced into the caustic filtrate, to prevent its re-use in the green ash fusion. The preliminary removal of carbonate with Ca(OH)$_2$ is preferable to using Ba(OH)$_2$ for this purpose.

Such mixtures during treatment, should not be allowed to evaporate too far, as oxygen is then evolved, with the formation of a basic mangani-manganate similar to the product mentioned above in connection with the caustic fusions. Thus by evaporating to pasty-dryness, and thoroughly extracting with water, a dark blue green residue is obtained, in place of the "smalt blau" manganate, which contains only about 40% BaMnO$_4$.

To summarize, probably the best method of making BaMnO$_4$ is by a preliminary fusion of NaOH and MnO$_2$, which is bleached, filtered and treated first with Ca(OH)$_2$ to precipitate CaCO$_3$, and then with Ba(OH)$_2$ to precipitate BaMnO$_4$. This gives a very high purity BaMnO$_4$ with a minimum amount of BaO used. Considering the great saving in the later conversion of this material to permanganate this method is undoubtedly the cheapest.

Barium manganate is an intermediate product in the manufacture of barium, calcium and magnesium permanganates. Barium manganate, as prepared by either fusion or precipitation methods may be converted into barium permanganate either by direct oxidation, as by the use of chlorine or ozone, or by the action of acids, the liberated manganic acid acting as its own oxidizing agent, being itself partially reduced to manganese dioxide in consequence. The calcium permanganate may be obtained by metathesis with the somewhat soluble calcium sulphate, or by neutralizing the acid solution of permanganate with milk of lime.

Of these two methods, direct oxidation, on the one hand, and indirect oxidation, by acids on the other hand, the former appears to be at first sight preferable, because of its directness and because none of the product is used up in the process. Of the available oxidizing agents to oxidize directly manganate to permanganate including chlorine, bromine, and ozone, the first of these is the most practicable for technical use. Bromine is barred because of its scarcity and cost. The use of ozone is entirely too expensive. Even electrolytic oxidation methods, relatively much more efficient than the ozonizing methods, involve much expensive apparatus.

Chlorination is undoubtedly the best and most economical process of converting BaMnO$_4$ into Ba(MnO$_4$)$_2$ for any purpose where the large amount of chloride impurities could be tolerated. The nitric acid process is undoubtedly the next best, and it appears from the data now available that by careful removal of the nitrate formed by crystallization, a product pure enough for certain more special uses may be made. If still greater purity is required recourse must be had to the carbonation or sulphation methods. Each has some advantages, but both have serious disadvantages for practical commercial operation. The final choice between the two would probably depend on local plant conditions. The Ca(MnO$_4$)$_2$ is made by either of two ways, depending on the process used in oxidizing the BaMnO$_4$. If Ba(MnO$_4$)$_2$ is made, the calcium salt is made by metathesis with CaSO$_4$, filtering off the BaSO$_4$. Owing to the much greater stability of Ba(MnO$_4$)$_2$ as compared with Ca(MnO$_4$)$_2$ all possible purification, filtration and concentration should be done before the final conversion to Ca(MnO$_4$)$_2$ is made.

When a solution or a suspension of a manganate is acidified, manganic acid, being very unstable, breaks down into the relatively much more stable permanganic acid and manganese dioxide. Permanganic acid, while relatively much more stable than manganic acid, is, however, quite unstable except at low concentrations and low temperatures. Any plan of acid treatment involved in permanganate manufacture must take into account this instability. The action of light is similar but much less appreciable than that of heat.

The action of carbon dioxide, or of nitric and sulphuric acid respectively, may be regarded as that of typical acids as regards the reaction and the products obtained. Carbon dioxide is of course a gas with very slight solubility in water, giving an acid solution of exceedingly low hydrogen ion concentration, and in consequence drives the reaction to completion, mainly by removing insoluble equilibrium products.

3BaMnO$_4$+2CO$_2$= 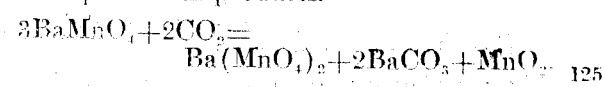

This reaction is complete and irreversible on account of the insolubility of the products formed, but, as might be expected from the slight solubility of both of the reacting substances, carbon dioxide and barium manganate, the solubility of the latter being comparable to that of barium sulphate the rate of reaction is practically negligible at ordinary temperatures and very slow even at the boiling temperature. The great advantage of carbonation for converting barium manganate lies in the very pure product to be obtained by this method.

By using sulphuric acid in place of carbon dioxide a soluble reacting substance is substituted for a very slightly soluble one and thus the rate of reaction is greatly increased at the corresponding temperatures. Two of the reaction products are as before insoluble. The use of this acid however, produces such a high hydrogen ion concentration that it is no longer possible to work above ordinary or room temperatures on account of the spontaneous decomposition of permanganic acid. This decomposition is appreciable even at low temperatures.

This reaction is apparently also retarded by the insoluble product barium sulphate which seems to have a mechanical retarding effect upon the yet undissolved manganate, apparently by the formation of an insoluble coating upon the particles. This increases the amount of decomposition by increasing the length of treatment required for complete conversion and requires the use of excess $H_2SO_4$.

In the $CO_2$ process the reaction can be stopped when $Ba(MnO_4)_2$ is obtained according to the equation:

$$3BaMnO_4 + 2CO_2 \longrightarrow 2BaCO_3 + Ba(MnO_4)_2 + MnO_2.$$

Theoretically, it would appear that the same result would follow by using $H_2SO_4$ according to the equation $$3BaMnO_4 + 2H_2SO_4 \longrightarrow 2BaSO_4 + Ba(MnO_4)_2 + MnO_2 + 2H_2O.$$

and actually this must be passed thru as an intermediate stage, but in order to obtain complete conversion of the manganate enough acid must be added to carry the reaction still further to the following stage $$Ba(MnO_4)_2 + H_2SO_4 \longrightarrow BaSO_4 + 2HMnO_4.$$

By adding $Ca(OH)_2$ to this reaction mixture, calcium permanganate is obtained. This is essentially the equivalent of adding $CaSO_4$ in the alternative method, except that the process is carried out in two stages, i. e., first the steps of precipitating the $BaSO_4$ by the $H_2SO_4$ and then the neutralization of the $HMnO_4$ by means of $Ca(OH)_2$. If milk of lime is employed for the neutralization, the resulting filtered solution of calcium permanganate is of course contaminated with calcium sulphate.

In the case of nitric acid there is again one soluble reacting substance, in this resembling the action of sulphuric acid, but with an additional soluble product, this latter involving an impurity in the final product obtained. Upon the other hand the reaction proceeds so rapidly in the cold that decomposition is reduced to a minimum. As with sulphuric acid, however, at least some excess of nitric acid is required in order to work with the requisite rapidity due in this case to the fact that the reaction products are not as insoluble as before, and there is apparently a measurable equilibrium set up before the reaction is complete.

$$3BaMnO_4 + 6HNO_3 = 2HMnO_4 + MnO_2 + 3Ba(NO_3)_2 + 2H_2O.$$

The nitric acid has absolutely no direct oxidizing action in this process, its action is solely that of an acid.

If barium hydroxide is used to neutralize the permanganic acid and any excess nitric acid, the resulting solution contain barium nitrate and permanganate. By evaporation it is possible to concentrate the relatively more stable barium permanganate and separate the less soluble barium nitrate. If calcium hydroxide is used for this neutralization and the clear filtrate concentrated by evaporation, the least soluble salt barium nitrate first tends to separate out, followed by calcium nitrate until when concentrated to about a 20% $Ca(MnO_4)_2$ only about 5% $Ca(NO_3)_2$ remains in solution and a much smaller proportion of $Ba(NO_3)_2$.

As an example of our process the following experiment was carried out. 22 liters of green liquor made by an ordinary $NaOH$—$MnO_2$ fusion containing 5.5% of sodium manganate and 24.3% of caustic alkali, part of which was in the form of carbonate, was boiled for 5 hours with 4 kilograms of 90% hydrated lime to remove the carbonate. The sludge was removed by decantation and filtration, and 12 liters of the filtrate containing 3.4% of sodium manganate, was boiled with 1 kilogram of hydrated barium hydroxide for one hour. The solution gradually became purplish but the green color of manganate still persisted and successive treatments with two portions of 100 grams each of barium hydroxide for one hour each followed. The solution was cooled and filtered. The dried precipitate was a purplish blue color and contained about 1 kilogram of 74% barium manganate.

Fifty grams of the 74% barium manganate was suspended in one half liter of water and was treated with four successive portions of diluted nitric acid (1 to 10) each portion being slightly in excess of that theoretically required to produce complete conversion. The reacting mass was kept cool at all times. The final residue was entirely converted without requiring the boiling with sodium carbonate which it was necessary to employ to complete the conversion when carbonic or sulphuric acids were used. The mass was filtered and washed, and the filtrate neutralized and concentrated to 20% barium permanganate, the crystals of nitrate being removed after cooling. Calcium sulphate was added to precipitate barium sulphate. The yield of calcium permanganate was 91.8% of the theoretical. The total time of treatment was four hours.

It is to be understood that by the term "alkali earth metal," we include calcium, barium, strontium and magnesium.

Having thus described our invention and illustrated its operation by a specific example, we claim:

1. In a process of making permanganates, adding to barium manganate a reagent which reacts therewith to produce permanganate radical and treating the same with a compound of an alkali-earth metal and forming the corresponding permanganate.

2. In a process of making permanganates, adding to an alkali-earth metal manganate a reagent which reacts therewith to produce permanganate radical and treating the same with a compound of an alkali-earth metal.

3. In a process of making permanganates, adding to an alkali-earth metal manganate a reagent which reacts therewith to produce permanganate radical and treating the same with a calcium compound.

4. In a process of making permanganates, adding to an alkali-earth metal manganate a reagent which reacts therewith to produce permanganate radical and treating same with calcium hydroxide.

5. In a process of making permanganates, adding an oxidizing acid to an alkali-earth metal manganate and then treating the solution with a compound of an alkali-earth metal.

6. In a process of making permanganates, adding nitric acid to an alkali-earth metal manganate and then forming calcium permanganate by treating the solution with a calcium compound.

7. In a process of making permanganates, adding nitric acid to barium manganate and then forming calcium permanganate by treating the solution with a calcium compound.

8. In a process of making permanganates, adding nitric acid to barium manganate, then forming calcium permanganate by treating the solution with a calcium compound and maintaining the solution cool at all times.

9. In the process for the production of permanganates the steps which consist in forming permanganic acid and treating the same with an alkali-earth metal compound to produce an alkali-earth metal permanganate.

10. In the process for the production of permanganates the steps which consist in forming permanganic acid and treating the same with an alkali-earth metal hydroxide.

11. In the process for the production of permanganates the steps which consist in forming permanganic acid and treating the same with calcium hydroxide.

12. The process for the production of permanganates which consists in forming barium manganate, oxidizing part of the same to produce permanganate radical and treating the same with a compound of an alkali-earth metal and forming the corresponding permanganate.

13. The process for the production of permanganates which consists in forming an alkali-earth metal manganate, oxidizing part of the same to produce permanganate radical and heating the same with a compound of an alkali-earth metal.

ROBERT E. WILSON.
LEON W. PARSONS.
STANLEY L. CHISHOLM.